Patented Oct. 3, 1944

2,359,280

UNITED STATES PATENT OFFICE 2,359,280 p,p'-DIAMINOBENZIL

George W. Anderson, Stamford, Conn., assignor to American Cyanamid Company, New York, N. Y., a corporation of Maine No Drawing. Application October 6, 1943, Serial No. 505,185

3 Claims. (Cl. 260—570)

This invention relates to the preparation of a new compound, p,p'-diaminobenzil.

The compound, while belonging to a group entirely different in chemical structure from sulfones or sulfanilamides, is very similar in usefulness as a bacteriostatic agent in the treatment of diseases due to bacterial infections.

While the present invention is not limited to any particular process, I have found that a high-quality product can be prepared by the reduction of p,p'-dinitrobenzil to p,p'-diaminobenzil.

The present invention will be described in greater detail in conjunction with the following example, which is merely illustrative of the preferred method of preparing a representative compound and not intended to limit the scope of the invention:

2.22 g. of p,p'-dinitrobenzil (Blitz, Ann. 368:262 (1909)) is added to a boiling solution of 28.8 g. of $FeSO_4 \cdot 7H_2O$ in 60 ml. of water. A small amount of ethyl alcohol is added to increase the solubility of the compound. The mixture is then made alkaline by adding ammonium hydroxide, boiled gently, and filtered. Some p,p'-diaminobenzil precipitates on cooling, and more is obtained by extracting the reaction residues with boiling alcohol. The product is purified by precipitating from acid solution with alkali, and then recrystallizing from dilute alcohol. The melting point is about 166–167° C.

While in the above example ethyl alcohol is used to increase the solubility of p,p'-dinitrobenzil, it is to be understood that other lower aliphatic alcohols, such as methyl, propyl, isopropyl, butyl, isobutyl, etc., also dioxan, acetone, etc., can be used. In other cases the reduction can be carried out in an aqueous medium without the addition of other solvents.

The reduction of p,p'-dinitrobenzil to p,p'-diaminobenzil is carried out by the use of ferrous sulfate in the specific example. It should be understood, however, that other reducing agents can be used, such as, ammonium sulfide, ferrous hydroxide, etc. Similarly, if desired, the reduction can be carried out catalytically, i. e., by introducing hydrogen into a solution of the p,p'-dinitrobenzil in the presence of a suitable catalyst. Among the suitable catalysts are platinum oxide, platinized or palladinized active charcoal, celite, and Superfiltrol.

The above description and example are intended to be illustrative only. Any modification or variation therefrom which conforms to the spirit of the invention is intended to be included within the scope of the claims.

What I claim is:

1. The compound of the formula:

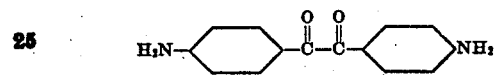

2. The process for producing p,p'-diaminobenzil which comprises reducing p,p'-dinitrobenzil to p,p'-diaminobenzil.

3. The process for producing p,p'-diaminobenzil which comprises reducing p,p'-dinitrobenzil to p,p'-diaminobenzil by the use of ferrous sulfate.

GEORGE W. ANDERSON.